United States Patent [19]

Dilouya

[11] Patent Number: 4,680,679

[45] Date of Patent: Jul. 14, 1987

[54] MOTOR VEHICLE MAIN BEAM HEADLAMP INCORPORATING AN ELLIPTICAL REFLECTOR AND A PARABOLIC REFLECTOR

[75] Inventor: Gilbert Dilouya, Paris, France

[73] Assignee: Cibie Projecteurs, France

[21] Appl. No.: 853,060

[22] Filed: Apr. 17, 1986

[30] Foreign Application Priority Data

Apr. 22, 1985 [FR] France ................................ 85 06050

[51] Int. Cl.[4] ................................................ B60Q 1/04

[52] U.S. Cl. ...................................... 362/61; 362/298; 362/346

[58] Field of Search ..................... 362/61, 80, 83, 298, 362/299, 341, 346

[56] References Cited

U.S. PATENT DOCUMENTS

| | | | |
|---|---|---|---|
| 1,981,328 | 11/1934 | Rivier | 362/298 |
| 4,333,130 | 6/1982 | Mochizuki et al. | 362/293 |
| 4,456,948 | 6/1984 | Brun | 362/268 |

FOREIGN PATENT DOCUMENTS

| | | | |
|---|---|---|---|
| 1919199 | 11/1969 | Fed. Rep. of Germany | 362/346 |

*Primary Examiner*—Samuel Scott
*Assistant Examiner*—Allen J. Flanigan

[57] ABSTRACT

A headlamp of the type comprising: a light source (10); a two-focus elliptical reflector (20) having a base focus ($F_1$) and a front focus ($F_2$), said base focus being disposed in the vicinity of said light source and close to the base of the reflector, and said front focus being disposed in front of said base focus; and a parabolic reflector (30) having its focus ($F_2$) in the vicinity of said front focus of said elliptical reflector. The base of the elliptical reflector is provided with an opening for directly passing light from said light source, and a first sector (40) of a parabolic type reflector is provided with its focus in the vicinity of said light source and is disposed to reflect such light after passing through said opening along the vehicle axis direction (31, 41) to increase the on-axis main beam light intensity.

8 Claims, 4 Drawing Figures

MOTOR VEHICLE MAIN BEAM HEADLAMP INCORPORATING AN ELLIPTICAL REFLECTOR AND A PARABOLIC REFLECTOR

The present invention relates to motor vehicle headlamps for long distance illumination, and in particular to main beam headlamps.

BACKGROUND OF THE INVENTION

Generally speaking, and without going into the details of the regulations applicable in a any particular part of the world, it is safe to say that such a beam must satisfy two fundamental conditions:

firstly it must have high light intensity along the direction its optical axis, which directionn corresponds with the longitudinal axis of the vehicle, thereby enabling visibility to be obtained at a considerable distance in front of the vehicle; and secondly it must dissipate condsiderable flux in a relatively large solid angle about its axis so that the sides of the road are illuminated at ground level and up to a sufficient height for the vehicle driver to see all kinds of obstacles.

With references to the high intensity condition, it is known that the intensity of a light beam returned by a reflector is proportional to the frontal area of said reflector (Blondel's law).

Currently used main beam headlamps generally include a reflector whose reflecting surface is a paraboloid of revolution with an open front of relatively large diameter (not less than 10 cm) thus presenting a large frontal area (the area of the reflector projected onto a plane perpendicular to its optical emission axis), and being sufficiently enveloping in shape around the bulb disposed at its focus for it to recover as large a fraction as possible of the light flux emitted thereby. This construction provides a satisfactory compromise between range and performance.

However, main beam headlamps having a parabolic reflector of the above type suffer from the considerable drawback of a relatively large diameter. In practice this means that main headlamps must take up a relatively large amount of room in the vertical direction since even when the parabolic reflector is truncated between horizontal planes, some minimum height remains necessary in order to ensure that on-axis light intensity remains high enough (which is related to frontal area) and that general lighting also remains high enough (which is related to the total light flux reflected by the reflector).

FIGS. 1 and 2 are a diagrammatic front view and longitudinal section respectively through a prior art parabolic reflector, and show the results obtained thereby. Such a parabolic reflector R has a focus F at which a light source L is situated. The reflector is truncated top and bottom by two horizontal planes $H_1$ and $H_2$ which are disposed on either side of the optical axis OO passing through on the focus F. It can be seen that if the reflector R is given a height $h_1$ (i.e. the distance between the plane $H_1$ and $H_2$), this height corresponds to a frontal area $S_1$ and an emitted flux $\phi_1$. If the height is then reduced to a value h, it can be seen from FIG. 1 that the frontal area is reduced to a value S thereby reducing performance. It can also be seen, form FIG. 2 that the light source disposed at the focus F of the reflector R is simultaneously less completely enveloped, thereby reducing the total flux reflected from $\phi_1$ to $\phi$.

Unfortunately, the trend in modern motor car design is towards headlamps of reduced height (both for stylistic and for aerodynamic reasons), and this height may lie in the range 4 mm to 8 cm. For the reasons explained above, such reduced heights are generally incompatible with conventional headlamp design using parabolic reflectors.

One way of mitigating these drawbacks is to use elliptical reflectors having an opening of small size, with the light source being disposed at the inside focus of an elliptical reflector constituting a flux capturing system. Such a disposition has the major advantage of recovering an optimum amount of light flux from the source: it is obvious that an elliptical reflector occupies a much larger solid angle around the light source than can a parabolic reflector, so that for a given light source and for equal quantities of flux emission, the volume occupied by an elliptical reflector and the diameter of its open outher end are both much less than for a parabolic reflector. More precisely, inorder to implement an elliptical reflector acting as a flux capturing system, it is necessary to use a combination of an elliptical reflector co-operating with a light source located substantially at one of its focuses and sending light rays from said source in a converging beam towards its other focus, in conjunction with an optical deflector component which picks up the converging beam reflected by the elliptical reflector and which transforms it into a beam of substantially parallel rays for constituting the beam emitted by the headlamp, overall. Such an optical deflector component which co-operates with the elliptical reflector, may be a converging lens or a paraabolic reflector.

The present invention relates more particularly to the latter structure, i.e. to headlamps which make use of a combination of an elliptical reflector and of a parabolic reflector.

More precisely, the present invention concerns headlamps of the type comprising: a light source; a two-focus elliptical reflector having one of its focuses in the vicinity of the light source and close to the base of the reflector, and having its other focus in front of said source; and a parabolic reflector whose focus is close to the front of the elliptical reflector so that light rays emitted by the source and reflected by the elliptical reflector towards the focus of the parabolic reflector are finally reflected by the parabolic reflector as a beam of substantially parallel rays which constitute the headlamp beam.

Such a structure is known in the prior art, and is described, for example, in U.S. Pat. No. 1,981,328, in French patent No. 69.40151 (published under the number 2 067 925) and in published German patent application No. 3 317 149.

However, although such a structure is highly satisfactory in capturing light flux emitted by the light source, and in enabling elliptical reflectors having small diameter openings to be used, thereby enabling headlamps of small vertical extent to be provided, it suffers from the drawback of not giving very high light intensity on the vehicle axis. That is why it has only been suggested in the prior art for use in making dipped beam lamps, which do not require high intensity on the illuminated axis.

Preferred embodiments of the present invention provide a main beam headlamp of small vertical size using a structure of the above type but remedying the above drawbacks so as to provide both high intensity on the illumination axis and considerable light flux in a solid angle extending substantially all around the optical axis along which light is emitted.

SUMMARY OF THE INVENTION

The present invention improves the above-defined elliptical-parabolic headlamp structure by using at least one sector of a parabolic type reflector to capture light which is not reflected by said elliptical reflector and to project it as a generaly parallel beam to reinforce the on-axis intensity of the main beam from the main parabolic reflector. The light which is not reflected by the elliptical reflector may be light which escapes through its front opening, or it may be light which escapes through a base opening provided specially for that purpose. Such improvements and additions to the abovedefined elliptical-parabolic headlamp structure may be taken together or separately, to constitute characteristics of the invention.

More particularly, the present invention provides a headlamp of the type comprising:

a light source;

a two-focus elliptical reflector having a base focus and a front focus, said base focus being disposed in the vicinity of said light source and close to the base of the reflector, and said front focus being disposed in front of said base focus; and a parabolic reflector having its focus in the vicinity of said front focus of said elliptical reflector;

wherein the base of the elliptical reflector is provided with an opening for directly passing light from said light source, and wherein a first sector of a parabolic type reflector is provided with its focus in the vicinity of said light source and is disposed to reflect such light after passing through said opening along the vehicle axis direction to increase the on-axis main beam light intensity.

According to an optional feature of the invetion, the headlamp further includes a second reflector of the parabolic reflector type placed in a co-operative relationship with said elliptical reflector to intercept light rays directly emitted by said light source other than the light rays which are reflected by the elliptical reflector, and to reflect said intercepted light rays along the emission direction.

According to an another optional feature of the invention, the light source is a bulb disposed across the axis of the elliptical reflector.

Together or separately, the two parabolic sectors cooperating with light rays coming directly from the source serve to increase on-axis light intensity. The resulting beam has optimum characteristics for a headlamp main beam, while keeping the vertical size of the headlamp to a value limited to the effective diameter of the elliptical mirror.

BRIEF DESCRIPTION OF THE DRAWING

An embodiment of the invention is described by way of example with reference to the accompanying drawing, in which.

MORE DETAILED DESCRIPTION

Figure 3:
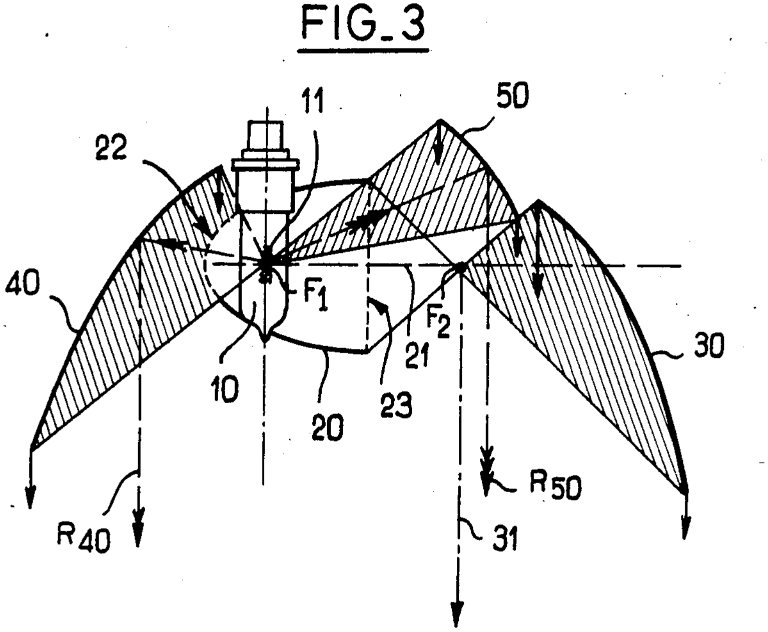
FIG. 3 is a diagrammatic horizontal section through a headlamp in accordance with the invention.
Figure 4:
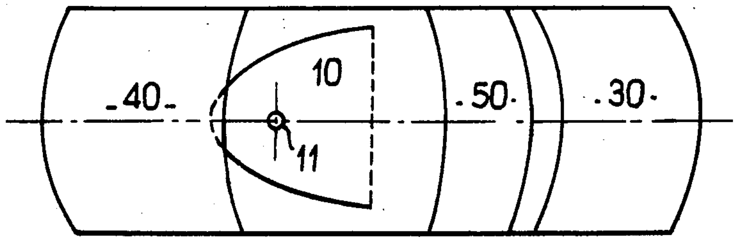
FIG. 4 is a front view of the FIG. 3 headlamp.

The headlamp in accordance with the invention, as shown in FIGS. 3 and 4, is intended to provide a main beam for a road vehicle. Since the present invention is concerned with solutions to optical problems, only the optical systems are shown with the assembly parts being omitted together with the housings and adjustment parts.

This headlamp essentially comprises a bulb 10 constituting the light source, an elliptical reflector 20 cooperating with the bulb, and a parabolic reflector 30 reflecting light rays from the lamp as reflected by the elliptical reflector 20 and thereby providing the emitted beam. More precisely, the elliptical reflector 20 having an optical axis 21 includes two focuses: $F_1$ close to the base of the elliptical reflector 20 and $F_2$ at a distance from said base and beyond the front of the reflector 20. The bulb 10 constituting the light source has a filament 11 which extends (as shown) in a direction generally perpendicular to the axis 21, and in the vicinity of the focus $F_1$. Light rays from such a filament 11 are reflected by the elliptical reflector 20 and converge substantially at the focus $F_2$, after which they strike the parabolic reflector 30 whose focus is substantially at $F_2$, and the beam as finally emitted by the headlamp is emitted along the axis 31 of the parabolic reflector, which axis extends transversely relative to the axis 21 of the elliptical reflector, and preferably perpendicularly thereto.

This basic construction is known per se, and provides a beam which is satisfactory in the amount of flux it collects from the bulb 10 and in the way in which this flux is distributed over a relatively large solid angle around the emission direction 31.

However, it is well known that the system 10-20-30 is incapable of providing a satisfactory main beam with respect to the intensity of on-axis light in the emission direction.

The invention seeks to remedy this drawback by means of two dispositions which are preferably, but not necessarily, applied in combination.

Firstly, the elliptical reflector 20 is provided with a base opening 22 extending over a large solid angle which may be as much as 100° of the total angular aperture.

A first reflecting sector 40 of the parabolic type is placed to face said opening 22 and has its focus in substantially the same position as the focus $F_1$ and has its axis 41 parallel to the main emission direction 31. It will be understood that the filament 11 emits light waves which pass through the aperture 22 and strike the parabolic sector 40, and that these rays are reflected along the emission direction. The parabolic sector 40 thus intercepts a considerable amount of light flux (as defined by the solid angle subtended by the opening 22) and reflects this flux along the emission direction, thereby reinforcing the light intensity along said direction and thus giving the headlamp the optical performance necessary for a headlamp main beam (light rays referenced $R_{40}$ in FIG. 3).

It may also be observed that the transverse disposition of the bulb 10 relative to the axis 21 of the elliptical reflector 20 is itself non-conventional and that this non-conventional position is essential for providing a light-passing opening through the base of the elliptical reflector 20.

The increased on-axis light intensity provided by the above-described disposition may suffice on its own to obtain a good main beam.

However, the invention also provides for collecting as much as possible of the light rays directly emitted by the bulb 10 and leaving the elliptical reflector 20 via its main or front opening 23, without striking the parabolic reflector 30. To this end, a second reflecting sector 50 of the parabolic type is placed in a co-operative relationship with said opeing 23 and slightly behind said aperture relative to the main emission direction 31, 41. The focus of this second parabolic sector is located substantially at $F_1$, and its emission axis 51 points in substantially the same direction as the main emission direction axes 31 and 41.

As can be seen in FIG. 3, light rays such as $R_{50}$ are emitted from the filament 11 of the bulb 10 and pass through the opening 23 of the elliptical reflector 50 prior to being reflected by the reflector 50 along the main emission direction, where they reinforce the intensity of light emitted in this direction, thereby further improving main beam illumination.

Figure 1:
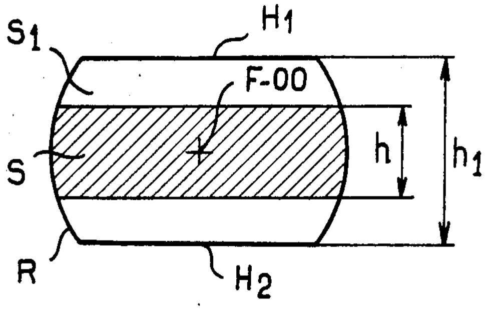
FIGS. 1 and 2 are diagrams of the prior art, as described above.
Figure 2:
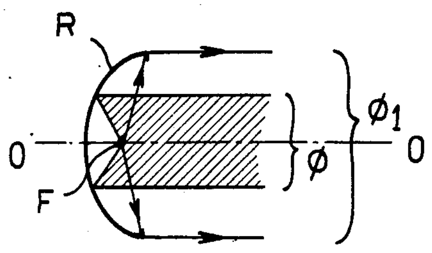

FIG. 4 is a front view of the FIG. 1 headlamp. In such a front view, it can been that the vertical size of the headlamp is limited to a value H by truncating the headlamp by horizontal planes passing through the parabolic sectors 30, 40 and 50. Preferably, the height H is close to the peripheral diameter of the main opening 23 of the elliptical reflector 20.

Theoretical calculations show, and experimental results confirm, that using the dispositons in accordance with the invention it is possible to obtain a main beam headlamp which satisfies the standards laid down by regulations, while limiting the vertical size of the headlamp, which was heretofore not possible when using the prior art elliptico-parabolic optical system. Naturally, the "parabolic type" sectors 40 and 50 may depart slighty from being truly parabolic surfaces, provided they reflect a substantial portion of the light they receive towards infinity along the emission direction.

I claim:

1. A headlamp of the type comprising:

a light source;

a two-focus elliptical reflector having a base, a base focus and a front focus, said base and said base focus being disposed in the vicinity of said light source and close to the base of the reflector, and said front focus being disposed in front of said base focus; and a parabolic reflector adapted to reflect light from said front focus in a direction substantially along a veicle axis and having its focus in the vicinity of said front focus of said elliptical reflector;

wherein the base of the elliptical reflector is provided with an opening for directly passing light from said light source, and wherein a first sector of a parabolic type reflector is provided with its focus in the vicinity of said light source and is disposed to reflect such light after passing through said opening along the vehicle axis direction to increase the on-axis main beam light intensity.

2. A headlamp according to claim 1, further including a second reflector of the parabolic reflector type placed in a cooperative relationship with said elliptical reflector to intercept light rays directly emitted by said light source other than the light rays which are reflected by the elliptical reflector, and to reflect said intercepted light rays along the vehicle axis direction.

3. A headlamp according to claim 1, wherein the light source is a bulb disposed transversely to the axis of the elliptical reflector.

4. A headlamp according to claim 3, wherein the bulb has an axial filament extending substantially transversely to the axis of said elliptical reflector.

5. A headlamp according to claim 1, wherein said parabolic reflector and said parabolic type sector or sectors are truncated to extend in a vertical direction over a distance H substantially equal to the main opening of the elliptical reflector.

6. A headlamp according to claim 1, wherein the axes of the elliptical reflector and of the parabolic reflector are substantially perpendicular to each other.

7. A headlamp according to claim 1, wherein the vertical size of said headlamp lies in the range 4 cm to 8 cm.

8. A headlamp according to claim 2, wherein said parabolic reflector and said parabolic type sector or sectors are truncated to extend in a vertical direction over a distance H substantially equal to the main opening of the elliptical reflector.

* * * * *